(12) United States Patent
Elhagediab

(10) Patent No.: US 7,636,169 B2
(45) Date of Patent: Dec. 22, 2009

(54) BIOFIDELIC DISPLACEMENT MEASURING SYSTEM FOR AN ANTHROPOMORPHIC TESTING DEVICE

(76) Inventor: Ali M. Elhagediab, 7330 Hartwell, Dearborn, MI (US) 48126

( * ) Notice: Subject to any disclaimer, the term of this patent is extended or adjusted under 35 U.S.C. 154(b) by 276 days.

(21) Appl. No.: 11/422,116

(22) Filed: Jun. 5, 2006

(65) Prior Publication Data
US 2007/0279643 A1 Dec. 6, 2007

(51) Int. Cl.
*G01B 11/14* (2006.01)
*G01N 21/00* (2006.01)
(52) U.S. Cl. ........................ 356/614; 356/432
(58) Field of Classification Search ......... 356/614–624, 356/432–444
See application file for complete search history.

(56) References Cited

U.S. PATENT DOCUMENTS 5,332,901 A * 7/1994 Eckles et al. ............... 250/345
5,591,975 A * 1/1997 Jack et al. ................. 250/338.5
6,934,035 B2 * 8/2005 Yang et al. ................. 356/485

* cited by examiner

*Primary Examiner*—Michael P Stafira
(74) *Attorney, Agent, or Firm*—John A. Artz; Dickinson Wright PLLC

(57) ABSTRACT

A sensing system (22) for a device (34) contains a light absorbing or scattering object (44). An illumination device (50,72) generating and emitting an illumination beam into the object (44). A first light filter (85) has at least one associated light spectrum filtering frequency. A first light sensor (60,80) is coupled to the first light filter (85), receives a first object-emitted portion of the illumination beam, and generates a first signal in response to the first portion. A second light filter (88) has at least one associated light spectrum filtering frequency. A second light sensor (62,82) is coupled to the second light filter (88), receives a second objected-emitted portion of the illumination beam, and generates a second signal in response to the second portion. A controller (54) generates a parameter signal, associated with a characteristic of the object, in response to the first signal and the second signal.

3 Claims, 5 Drawing Sheets

BIOFIDELIC DISPLACEMENT MEASURING SYSTEM FOR AN ANTHROPOMORPHIC TESTING DEVICE

TECHNICAL FIELD

The present invention relates to anthropomorphic testing devices and to the sensors and system incorporated therein. The present invention also relates to fluid level and distance measuring within various mediums. More particularly, the present invention is related to the measuring of displacement within a fluid-holding, fluid-filled, or other light absorbing or scattering apparatus.

BACKGROUND OF THE INVENTION

Anthropomorphic test devices (ATDs), such as crash test dummies, are used as human surrogates to assess crash injuries. Several different systems and apparatuses have been introduced as an attempt to measure penetration, displacement, force, velocity, and acceleration on an ATD in the abdominal area. Although these systems and apparatuses have been somewhat successful in providing information related to one or more of the stated parameters, each of which have associated disadvantages and limitations.

One known apparatus for indicating ATD abdomen displacement resulting from belt loading is referred to as the "frangible abdomen". The frangible abdomen is a dynamically tuned biofidelic insert. The insert is formed of a crushable Styrofoam®. The crush of the foam is used to determine the amount of "submarining" and to quantify the injury risk associated therewith. The term "submarining" refers to when a lap belt rises up over the pelvic bone of a vehicle occupant.

Although the frangible abdomen has been referred to as a biofidelic insert, it only provides some level of biofidelity. The term "biofidelic" refers to the biomechanical aspects of a device or the ability of a device to be loaded and to respond to such loading in a human like fashion. In general, a system that is biofidelic has similar static and dynamic characteristics as that of a human. The frangible abdomen is a one time or single use device that is formed of a load-sensitive foam. Since the frangible abdomen is completely formed of foam, it does not provide the other static and dynamic characteristics of a human abdomen, which is primarily filled with bodily fluids. For example, the frangible abdomen or portions thereof do not disperse, move, flex, react, or perform in response to collision interactions with objects as would a human abdomen. The objects, for example, may be a seat belt, a steering wheel, an air bag, or parts of an ATD, such as the ribs of a ribcage. Thus, the frangible abdomen is limited in its ability to provide information that can be used to assess the interactions therewith.

In addition, the frangible abdomen is not instrumented. In not being instrumented, the frangible abdomen is incapable of providing time-based information. As such, abdominal interaction and abdominal insert performance during a collision event cannot be determined.

There have been a number of systems to produce an instrumented abdominal region or an instrumented abdominal insert. Some of these systems have included string potentiometers, strain gauges, and telescoping rods. These systems have also been directed to belt interaction and have used deflection, force, fluid pressure, or contact switch signals to indicate an injury level. Although the systems have provided some indication of belt interaction or abdominal displacement, the systems do not provide or have minimal biofidelic and rate sensitive characteristics, and all of which have there own associated disadvantages or drawbacks.

There are several techniques that have been proposed to define an abdominal injury criteria for assessing injury risk. The most promising criterion is the viscous criterion. The viscous criterion refers to the value determined by multiplying the maximum velocity V(t) experienced by the normalized compression C(t) of an abdomen during a collision event. As such, it is desirable for an abdominal sensing system to provide velocity and/or compression information for a device over time.

Thus, there exists a need for an improved abdominal sensing system that is biofidelic that overcomes the above-stated disadvantages and limitations, and that provides the desired information needed for determining injury risk.

SUMMARY OF THE INVENTION

One embodiment of the present invention provides a sensing system for a device that contains a light absorbing or scattering object. In the embodiment, the sensing system includes an illumination device, a first light filter, a first light sensor, a second light filter, a second light sensor, and a controller. The illumination device generates and emits an illumination beam into the object. The first light filter has at least one associated light spectrum filtering frequency. The first light sensor is coupled to the first light filter, receives a first object-emitted portion of the illumination beam, and generates a first signal in response to the first portion. The second light filter has at least one associated light spectrum filtering frequency. The second light sensor is coupled to the second light filter, receives a second object-emitted portion of the illumination beam, and generates a second signal in response to the second portion. The controller generates a parameter signal, which is associated with a characteristic of the object, in response to the first signal and the second signal.

Another embodiment of the present invention provides a method of determining distance between points on an object. The method includes the generation of an illumination beam. A first received portion of the illumination beam is filtered to generate a first signal. A second received portion of the illumination beam is filtered to generate a second signal. A parameter signal, associated with a distance between the points across a section of the object, is generated in response to the first signal and the second signal.

The embodiments of the present invention provide several advantages. One such advantage is an instrumented fluid-filled system for measuring displacement within an abdominal region of an anthropomorphic testing device. This allows for the collection of compression or displacement data over time for injury risk assessment.

Another advantage provided by another embodiment of the present invention is an instrumented biofidelic fluid-filled system, which provides accurate abdominal performance during a collision event and allows for the collection of displacement information thereof.

Yet another advantage provided by an embodiment of the present invention is a sensor system for the abdominal area of an anthropomorphic test device that is reliable, repeatable, and durable.

Furthermore, the present invention provides a sensing system that may be used to measure various parameters for fluid-filled or partially filled devices. Thus, the present invention is versatile in that it may be applied to a variety of different applications.

The present invention also provides a displacement measuring system that is inexpensive and easy to implement and manufacture.

The present invention, together with its objects and attendant advantages, is best understood by reference to the following detailed description, when viewed in conjunction with the accompanying drawing figures.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

Figure 1:
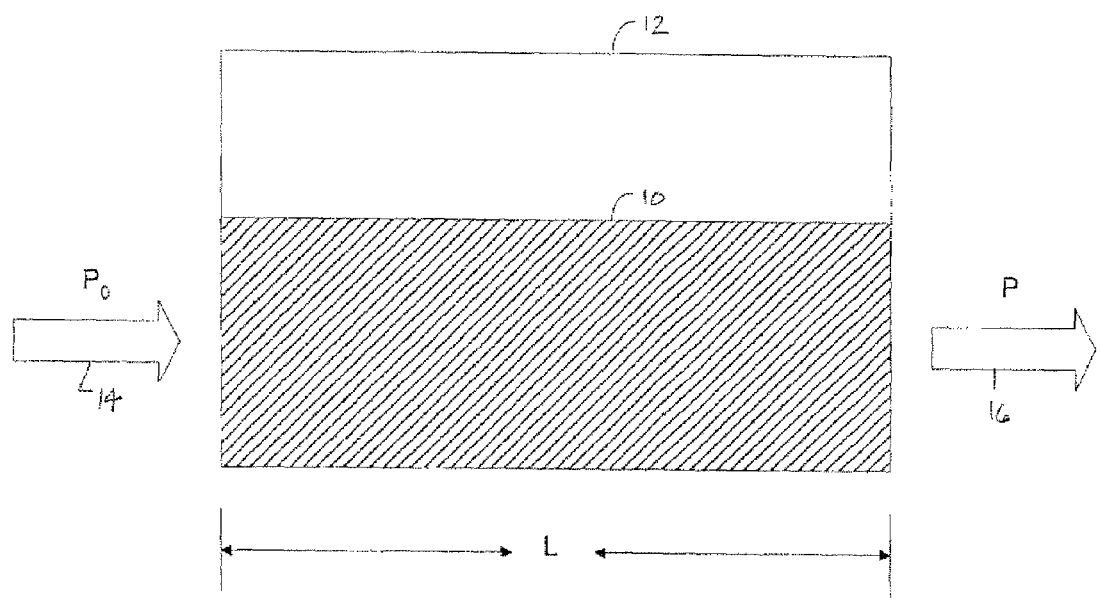
FIG. 1 is a side view illustrating light transmittance through a fluid contained within a device.

In the following figures the same reference numerals will be used to refer to the same components. While the present invention is described with respect to a system and method of measuring of displacement within a fluid-filled or holding apparatus, the present invention may be applied in various applications. The present invention may be utilized in association with various fluid and non-fluid-containing apparatuses. The present invention may be applied to pregnant or non-pregnant abdomens of an anthropomorphic test device (ATD), as well as to other organs, appendages, fluid-filled or containing members, flexible members, or other elements of and ATD such as the thorax. The present invention may also be applied to non-ATD applications, such as to fuel tanks, or other objects where knowledge of the distance between points or other related parameters is desired. Some other related parameters are displacement, compression, depth, fluid level, velocity, and acceleration. One may determine velocity and acceleration by integrating or double integrating a displacement signal.

Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Also, in the following description the term "object" refers to any item or group of items that are in a gas, fluid, or solid state. A couple of example objects are primarily described below including a fluid-filled bladder and a fluid contained within a tank. One skilled in the art would readily recognize that there is an abundant of other objects in which the present application may be applied. In general, however, an object refers to an item in which light can pass therethrough and absorbance or scattering of that light can be measured and/or differentiated. When in a solid state the object may be flexible or inflexible.

Referring now to FIG. 1, a side view illustrating light transmittance through a fluid 10 contained within a device 12 is shown. The device 12 shown is in the form of a tank or container. To alter or change the light absorbance characteristics, a pigment, dye, or other coloring substance may be in the fluid 10. Input light 14 having an initial or input power $P_0$ is emitted and directed to pass through the fluid. The output light 16 exiting the fluid 10 has output power P. The power P depends upon the absorbance A of the fluid 10 and the length or distance L across the fluid 10 through which the light passed. The relationship between the input power $P_0$, the output power P, the absorbance A, and the distance L can be shown using the Beer-Lambert law of light absorbance, sometimes referred to as the Beer-Lambert-Bouger law or simply Beer's law. The Beer-Lambert law holds for absorbance, as well as scattering. The Beer-Lambert law provides a linear relationship between the absorbance A and the distance or path length L and the concentration C of an absorber of electromagnetic radiation, such as the fluid 10, as shown by equation 1.

$$A = a_\lambda L C \tag{1}$$

The Beer-Lambert law provides that the absorbance A is equal to the wavelength-dependent absorption coefficient $a_\lambda$ for the wavelength $\lambda$ of the light in the fluid 10 multiplied by the path length L and the material concentration C.

In the past, the Beer-Lambert relationship has been used to measure the concentration of aqueous solutions and for weather and atmospheric measurements. For example, the Beer-Lambert law has been used to determine the concentrations of a material or a solution. In such applications, the length L is constant. The present invention, on the other hand, utilizes the Beer-Lambert law for a different purpose. The present invention uses the Beer-Lambert law to determine the length L of an object or portion thereof. More particularly, the present invention provides a system that determines the length L in a dynamic or changing environment.

The absorbance A is related to the input power value $P_0$ and the output power value P by the logarithmic base 10 relationship provided in equation 2.

$$A = -\log\left(\frac{P}{P_0}\right) = a_\lambda L C \tag{2}$$

The ratio of the output power P to the input power $P_0$ is referred to as the transmittance.

Assuming the type of fluid or absorbing material 10 and the concentration C of the absorbing material 10 in the container 12 are not changed, then the wavelength-dependent absorption coefficient $a_\lambda$ and the concentration C are constant. With the wavelength-dependent absorption coefficient $a_\lambda$ and the concentration C being constant, the length L is directly and linearly related to the absorbance A by a coefficient (slope) of wavelength-dependent absorption coefficient $a_\lambda$ multiplied by the concentration C.

Figure 2:
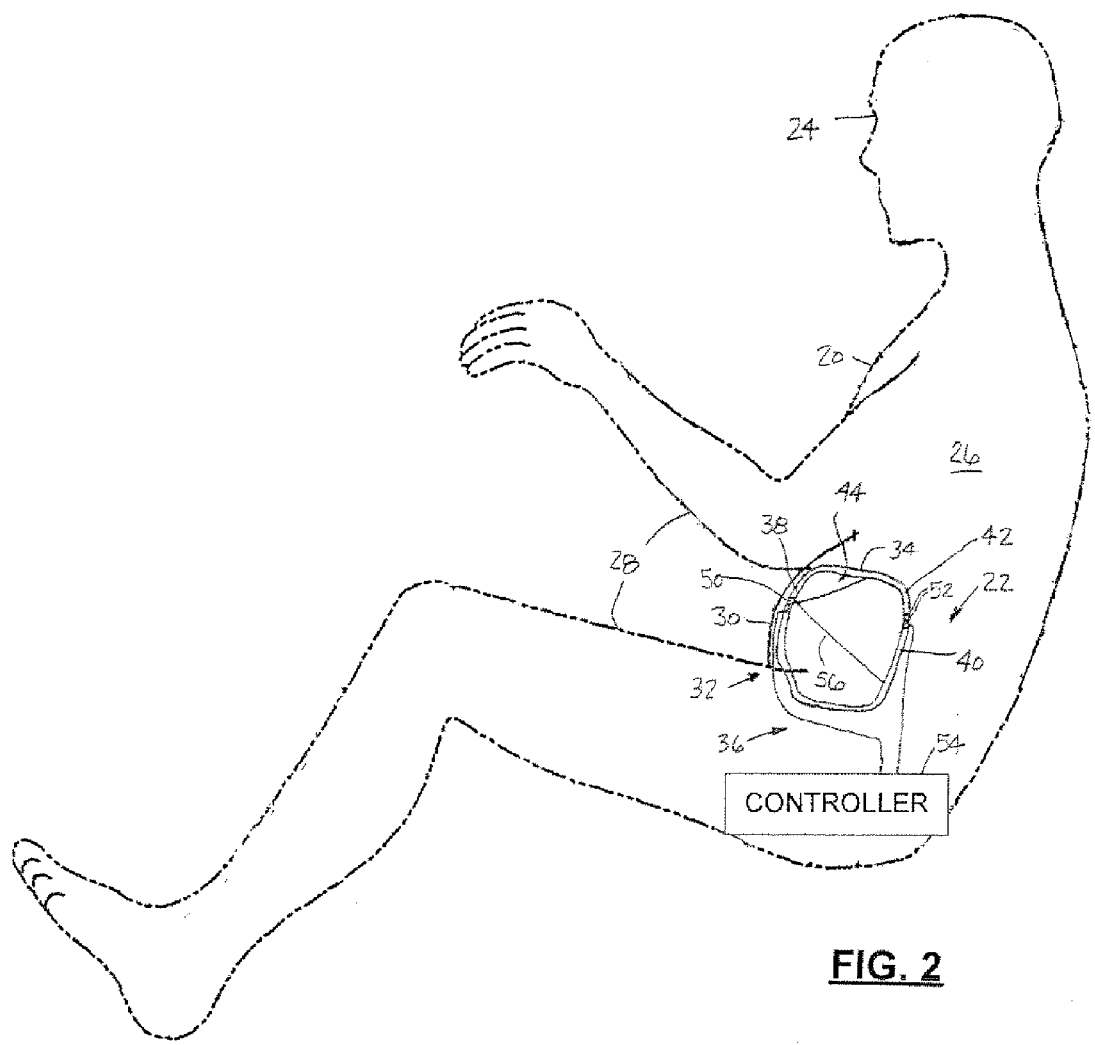
FIG. 2 is a side cross-sectional view of an anthropomorphic test device incorporating a biofidelic displacement measuring system in accordance with an embodiment of the present invention.
Figure 3:
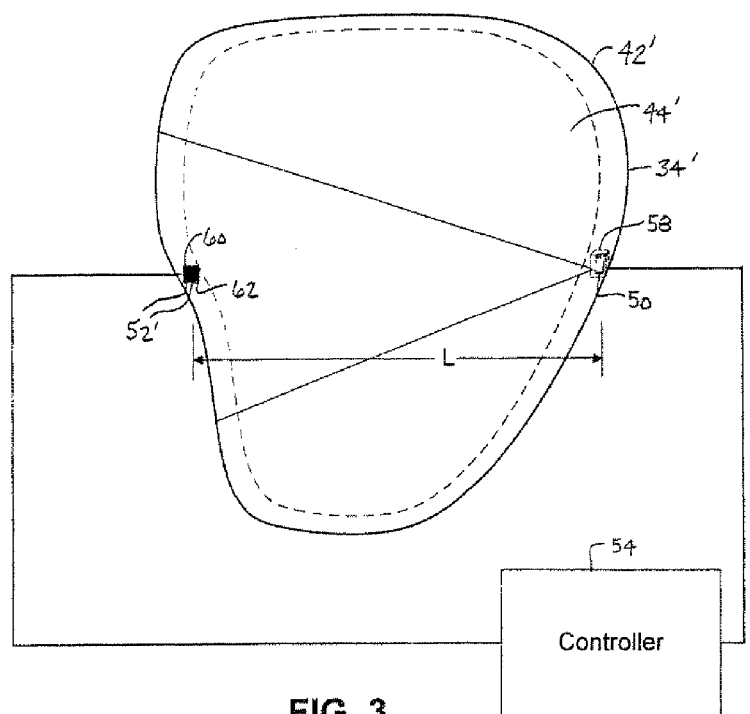
FIG. 3 is a side block diagrammatic view of the biofidelic displacement measuring system of FIG. 2.

Referring now to FIGS. 2 and 3, a side cross-sectional view of an ATD 20 incorporating a biofidelic displacement measuring or sensing system 22 and a side block diagrammatic view of the sensing system 22 in accordance with an embodiment of the present invention is shown. The ATD 20 may be in the form of a crash test dummy and in and of itself be biofidelic. The ATD 20 may have a biofidelic head 24, body 26, and extremities 28. The ATD 20 may also have a skeletal frame (not shown) and a skin 30. The sensing system 20 is located, in the embodiment shown, in the abdominal region 32 of the ATD 20 and is used to directly measure displacement, as well as to indirectly measure velocity and acceleration. The sensing system 20 includes a biofidelic fluid-filled abdomen or device 34 and a sensing circuit 36. The sensing circuit 36 is used to directly measure the displacement between the front wall 38 and the back wall 40 of the fluid-filled device 34.

The fluid-filled device 34 is in the form of a bladder and has an outer lining or shell 42 with an inner fluid 44. The shell 42 and the inner fluid 44 are formed of flexible materials. The shell 42 and the inner fluid 44 may be formed of a variety of materials. The shell 42 and the inner fluid 44 in combination have similar static and dynamic characteristics as a human abdomen. In one embodiment of the present invention, the shell 42 is formed of a silicone rubber material and the inner fluid 44 is formed of high viscosity silicone. Of course, other materials and material combinations may be utilized having similar properties depending upon the application. The shell 42 may be filled with a fluid, a gel, rubber, polyurethane, or other flexible material, or combination thereof. The materials utilized may be transparent or semi-transparent. The materials utilized may be considerably different for non-ATD applications as compared to ATD applications. The fluid-filled device 34 in being filled with a uniform substance, which has a single concentration level, has a constant or uniform wavelength-dependent absorption coefficient and concentration level throughout.

The shell 42 and the inner fluid 44 may have different or varying colors. Colors of the shell 42 and the inner fluid 44 may be preselected and pigments or other coloring substances may be added to the materials used to form the shell 42 and the inner fluid 44. The coloring may be introduced to help differentiate between the absorbance and/or scattering values for different colors, light spectrums or light frequency ranges, or one or more individual light associated frequencies. The shell 42 and the inner fluid 44, instead of or in addition to having a color filtering pigment may have a color scattering additive. For example, the inner fluid 44 may have a light scattering additive that allows blue light to scatter more than red light. The shell 42 and the inner fluid 44 may be formed of a natural substance that has light absorbance or scattering characteristics without added pigments or additives. The shell 42 may be transparent or opaque. The shell 42 may have a reflective inner or exterior lining (not shown) or have reflective features to reflect light internal or external to the fluid-filled device 34.

The sensing system 22 also includes one or more light sources or illumination devices 50 (only one is shown), one or more light sensors 52 (two are shown), and a controller 54 coupled thereto. Light in the form of a beam 56 is transmitted across and through the inner fluid 44 and is detected by the light sensors 52. In response to the received light detected by the sensors 52, the controller 54 determines the distance between the illumination device 50 and the light sensors 52. Although a particular number of illumination devices and sensors are shown and are shown in a single location, any number of which may be utilized and they may be located anywhere on or in the fluid-filled device 34. For example, three or more illumination devices or light sensors may be mounted rigidly with respect to each other, which will allow the measurement of displacements in three dimensions using triangulation techniques.

As shown, the illumination device 50 and the light sensors 52 and 52' of FIGS. 2-3 are integrally mounted on or within the shell 42. The illumination device 50 and the light sensors 52 and 52' may be mounted within one or more shell holders 58 (only one is shown in FIG. 3, with respect to the illumination device 50 on the fluid-filled device 34'). The fluid-filled device 34' is similar to the fluid-filled device 34. The shell holders 58 allow for the illumination device 50 and the light sensors 52 and 52' to be easily replaced. The shell holders 58 may be formed of various materials, which may be similar to the materials of the shells 42 and 42' and the inner fluids 44 and 44' or may be formed of other suitable materials.

The illumination device 50 may be in the form of an LED, a light bulb, a photoemitter, a visible light emitter, a non-visible light emitter, or may be in some other form known in the art. To correct for these conditions, the illumination device 50 may emit light at various frequencies including that within the visible light, ultraviolet light, and infrared light spectrums. The light sensors 52 and 52' may be in the form of a photosensor, a phototransistor, a camera, a charged-coupled device, a photodiode, an infrared sensor, an ultraviolet sensor, an optoelectronic sensor or other known light sensor. In one embodiment of the present invention, the inner fluid 44' has a red coloring pigment, the illumination device 50 emits visible light, and the light sensors 52 and 52' are filtered to detect either red light or blue light. The red pigment helps to differentiate the absorbencies of the red light and the blue light through the inner fluid 44'.

Note that the light sensors 52 and 52' are located in approximately the same location and are used to detect object-emitted portions of the illumination beam 56. Object-emitted portions refer to portions of the illumination beam 56 that have passed through at least a portion of the inner fluid 44 or 44'. Displacement measurements between the illumination device 50 and the light sensors 52 and 52' can be affected by misalignment between the stated items. For example, loss in received light power can inadvertently result due to a change in emission direction or orientation of the illumination device 50 or a change in the alignment of the light sensors 52 and 52' during a collision event. This directly and negatively affects the accuracy of collected data and can result in unusable information. The present invention overcomes this misalignment phenomenon. In order to reliably and accurately determine the distance between the illumination device 50 and the light sensors 52 and 52', and to overcome misalignment issues two or more light sensors are utilized and filtered and monitored at different light spectrum associated frequencies or frequency ranges. A single light sensor may be used, as long as different light spectrum frequencies can be monitored over approximately the same time interval. In one embodiment, the light sensors 52 and 52' are filtered to detect either red light or blue light, as shown by the embodiment of FIG. 3, which have different associated spectrum frequency ranges. The light sensors 52', as shown, have different shading to designate the red and blue light spectrum filtering associated therewith. This embodiment and associated detection is described in further detail below.

Misalignment of the illumination device 50 and the light sensors 52 and 52' is expected, especially when utilized in ATD applications. Also, other intensity variations or characteristics could affect the principle of operation such as beam diversion or a non-uniform light intensity profile. To correct for these conditions, the illumination device 50 emits a beam of light, such as the beams 56 and 56' that has at least two different wavelengths. The light sensors 52 and 52' and/or their corresponding circuitry are configured to detect each frequency of light having the stated wavelengths.

Assuming that a white light emitting diode (LED) is used as the illumination device 50, which contains red and blue components, and a first light sensor 60 is used to detect the red frequency spectrum and a second light sensor 62 is used to detect a blue frequency spectrum, then the following equations 3-8 hold true. Equations 3 and 4 provide the absorbencies $A_r$ and $A_b$ for the red and the blue spectrums of the beam 56', as emitted through the fluid-filled device 34', where $P_{r_0}$ is the red power input, $P_r$ is the red power output, $P_{b_0}$ is the red power input, $P_b$ is the red power output, $a_{\lambda r}$ is the red wavelength-dependent absorption coefficient, $C_r$ is the red concentration, $a_{\lambda b}$ is the blue wavelength-dependent absorption coefficient, and $C_b$ is the blue concentration. The term "power" refers to the light intensity level.

$$A_r = -\log\left(\frac{P_r}{P_{r_0}}\right) = a_{\lambda r} L C_r \qquad (3)$$

$$A_b = -\log\left(\frac{P_b}{P_{b_0}}\right) = a_{\lambda b} L C_b \qquad (4)$$

Subtracting the blue spectrum absorbance $A_b$ from the red spectrum absorbance $A_r$ results in equation 5.

$$A_r - A_b = -\log\left(\frac{P_r}{P_{r_0}}\right) - \left(-\log\left(\frac{P_b}{P_{b_0}}\right)\right) = a_{\lambda r} L C_r - a_{\lambda b} L C_b \qquad (5)$$

As such, the distance L between the illumination device 50 and the light sensors 52' can be derived from equation 5 and is provided by equation 6.

$$L = \frac{\log\left(\frac{P_{r_0} P_b}{P_r P_{b_0}}\right)}{a_{\lambda r} C_r - a_{\lambda b} C_b} \qquad (6)$$

Assuming that the ratio of the red light spectrum to the blue light spectrum for a single white illumination device, such as a white light LED, to be constant regardless of the orientation of the LED then the ratio of the red output power $P_{r_0}$ the blue output power $P_{b_0}$ is equal to a constant, generally designated as $k_p$. A light diffuser (not shown) mounted onto the illumination device 50 may be used to make the illumination beam 56' more homogenous. In addition, the red wavelength-dependent absorption coefficient $a_{\lambda r}$, the red concentration $C_r$, blue wavelength-dependent absorption coefficient $a_{\lambda b}$, and the blue concentration $C_b$ are also constant values since the materials and the concentration levels of the inner fluids 44 and 44' do not change. Also, the ratio provided in equation 7 of one over the stated coefficients and concentrations is equal to a coefficient/concentration constant $\alpha$.

$$\alpha = \frac{1}{a_{\lambda r} C_r - a_{\lambda b} C_b} \qquad (7)$$

Two different light spectrums are monitored, such as the red and blue light spectrums to assure that the associated light absorbencies for each color is different. The difference in light absorbance assures that the coefficient/concentration constant $\alpha$ is easily determinable. Equation 6 can be simplified and written as shown by equation 8.

$$L = \alpha \log \frac{k_p P_b}{P_r} \qquad (8)$$

The output powers $P_b$ and $P_r$ can be measured using the above-mentioned light sensors 52 and 52', which may be filtered. The electrical current measured from the light sensors 52 and 52' is approximately and directly related to the power of the measured light from the light sensors 52 and 52'. Therefore, the length L can be measured using the light sensors 52 and 52' and a log circuit or a log ratio amplifier, such as that mentioned below with respect to FIG. 4.

The outputs of the lights sensors 52 and 52', represented herein as the output currents $I_r$ and $I_b$, for each sensor respectively, are directly related to the output powers $P_r$ and $P_b$. Equations 9 and 10 provide this relationship, where $k_b$ and $k_r$ are the respective blue and red spectrum constants.

$$I_r = k_r P_r \qquad (9)$$

$$I_b = k_b P_b \qquad (10)$$

Combining equations 8-10 by replacing power outputs $P_r$ and $P_b$ results in equation 11.

$$L = \alpha \log\left[\left(\frac{k_p k_r}{k_b}\right)\left(\frac{I_b}{I_r}\right)\right] \qquad (11)$$

Equation 11 can be rearranged to provide equation 12.

$$L = \alpha \log\left(\frac{k_p k_r}{k_b}\right) + \alpha \log\left(\frac{I_b}{I_r}\right) \qquad (12)$$

By setting a constant $\beta$ equal to the component of equation 12, represented by the coefficient/concentration constant $\alpha$ multiplied by the logarithmic of the power constant $k_p$ multiplied by the ratio of the spectrum constant $k_r$ and $k_b$, results in equation 14. Equation 13 provides the expression for the constant $\beta$.

$$\beta = \alpha \log\left(\frac{k_p k_r}{k_b}\right) \qquad (13)$$

$$L = \alpha \log\left(\frac{I_b}{I_r}\right) + \beta \qquad (14)$$

Therefore, a log ratio can be used to measure the distance L between the illumination device 50 and the light sensors 52 and 52', regardless of the relative orientation of the sensors 52 and 52' with respect to the illumination device 50. The addition of filtering pigments to the inner fluids 44 and 44' can be added to aid in the differentiation of the measured absorbance values for the two light spectrums or any other light spectrums detected.

The principle provided by equation 14 can be used for visible and non-visible light spectrums and transmission mediums that have transparent or opaque pigments or fluids.

The above-described equations 3-14 are derived and provided for a single sample embodiment. Similar equations may be derived and utilized for other embodiments of the present invention. The equations, for instance, may be easily modified or used for different colored light spectrums or other non-visible light spectrums.

The controller 54 uses equation 14 in determining the distance L. The controller 54 may be microprocessor based such as a computer that has a central processing unit, a memory (RAM and/or ROM), and associated input and output buses. The controller 54 may be application-specific integrated circuits or may be formed of other logic devices and circuits known in the art. One example logic circuit is provided and described below with respect to FIG. 3. The controller 54 may be a portion of a central main control unit, a control circuit having a power supply, combined into a single integrated controller, located on or off an ATD or test device, may be a stand-alone controller, or be a combination of multiple controllers.

Note that although a single controller is shown as controlling the operation of the illumination device 50 and the sensors 52', the illumination device 50 and the sensors 52' may have separate circuits, modulating circuits, or control circuits, which may not have a controller. For example, the illumination device 50 may be activated manually and maintained in an "ON" state during data collection or system operation.

Although the embodiment of FIG. 2 is described with respect to a human ATD, the present invention may be applied to other animate object representations and structures and organs thereof.

Figure 4:
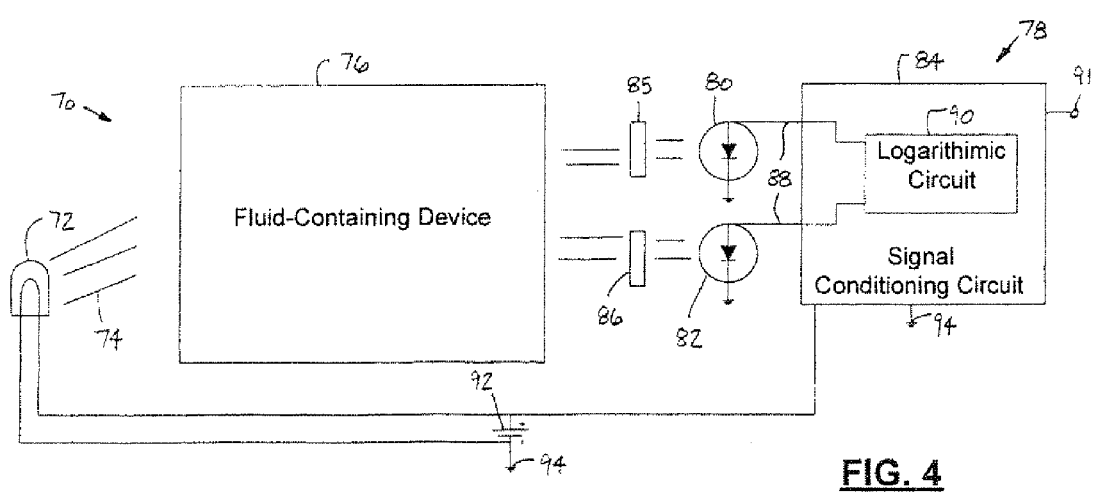
FIG. 4 is a sample schematic block diagrammatic view of a fluid distance measuring circuit in accordance with an embodiment of the present invention.

Referring now to FIG. 4, a sample schematic block diagrammatic view of a fluid distance measuring circuit 70 in accordance with an embodiment of the present invention is shown. The distance measuring circuit 70 includes an illumination source 72, which emits a light beam 74 through a fluid-containing device 76. Light transmitted through the fluid-containing device 76 is received by a light-monitoring circuit 78. The light-monitoring circuit 78 includes a first light sensor 80, a second light sensor 82, and a signal conditioning circuit 84. Light passed through the fluid-containing device 76 and is received by both of the sensors 80 and 82. The illumination source 72 and the sensors 80 and 82 may be similar to the illumination device 50 and the light sensors 52 and 52' described above. Although not shown the illumination device 72 and the sensors 80 and 82 may be in contact with or in the fluid-containing device 76. A first filter 85 and a second filter 86 are respectively coupled to the light sensors 80 and 82. Outputs 88 of the light sensors 80 and 82 are received by a logarithmic ratio circuit 90. The logarithmic circuit 90 uses a relationship, such as that provided above in equation 14, to determine the distance L between the illumination device 72 and the sensors 80 and 82. The distance L is provided at the circuit output 91 as a distance signal.

The filters 85 and 86 may be of various types and styles. The filters may be in the form of low pass filters, band pass filters, high pass filters, charge-coupled device (CCD) filters, or may be in some other form known in the art. The filters 85 and 86 are light spectrum frequency differentiating filters in that they are used to differentiate between two light spectrum frequencies or frequency ranges. In one described embodiment, the filters 85 and 86 are in the form of band pass filters, each of which having an associated frequency range. The first filter 85 has a different associated frequency range than the second filter 86. The filters 85 and 86 may be part of the sensors 80 and 82, be part of the signal conditioning circuit 84, be part of a controller, or be stand-alone filters. The filters 85 and 86 may be hardware filters, as shown, or may be software-based filters. The filters 85 and 86 may precede or be subsequent to the sensors 80 and 82. As shown, the filters are in the form of filter lenses, and permit pre-selected frequency ranges to pass through to the sensors 80 and 82. There may be gaps, such as air gaps between the illumination source 72 and the fluid-containing device 76 and between the fluid-containing device 76 and the filters 85 and 86 or the sensors 80 and 82, as shown.

The illumination source 72 and the signal conditioning circuit 84 receive power from a power source 92. The power source 92 may be a battery, an AC or DC power source, wired or wireless power source, or some other power source known in the art. The illumination source 72, the sensors 80 and 82, and the signal conditioning circuit 84 are coupled to ground 94.

The signal condition circuit 84 may be part of a controller and include signal-conditioning devices other than the logarithmic circuit 90, such as amplifiers, rectifiers, demodulation circuitry, demultiplexing circuitry, and other circuitry known in the art. For example, in one embodiment of the present invention multiple sets of illumination sources and sensor combinations are utilized. Each illumination source may be modulated at a certain frequency, pulsating frequency, coded frequency, amplitude modulated frequency, synchronous frequency, or other modulated frequency known in the art. When multiple illumination sources are utilized, the illumination sources and/or the sensors may be sequenced and signals therefrom may be sampled and held using data acquisition techniques known in the art. The sensors may receive the illumination beams generated from each of the illumination sources. To differentiate between the multiple received illumination beams demodulation circuitry may be utilized. This allows multiple distances to be determined for a single fluid-containing device.

Modulation, demodulation, and/or filtering of illumination beams and received light sensor signals may also be performed to account for intense external lighting, which is commonly used for high-speed camera recordation during collision simulations. A circuit rejecting light spectrum frequencies or modulated frequencies from light fixtures or the illumination sources used within or in association with the fluid-containing device may be used. For example, a filter may be used that rejects the light spectrum associated with ambient light or may reject the low modulation frequency that is associated with an alternating current (AC) power source, such as 60 Hz, on which it is carried.

The logarithmic circuit 90 may include one or more logarithm integrated circuit chips (not shown). A few examples of logarithm circuit chips that may be utilized are the logarithmic and log ratio amplifiers, model numbers LOG100, LOG102, LOG104, and LOG112, from Texas Instrument™.

In another embodiment of the present invention, the received output signals generated by the sensors 80 and 82 may be wirelessly transmitted to the signal conditioning circuit 84 or the output signal may be wirelessly transmitted to a data collection system (not shown). In order such wireless transmission, transmitters, receivers, and/or transceivers (all of which are not shown) may be incorporated into the distance measuring circuit 70, the sensors 80 or 82, and/or the signal conditioning circuit 84.

The data collected and the signals generated from the devices, controllers, circuits, herein described may be collected and stored in a data acquisition system, a memory, or other information gathering system. The type and method of data storage is not herein described. An abundant amount of data collecting, storing, and evaluating techniques currently exist and may be utilized in conjunction with the teachings described herein. Linearization and triangulation may be achieved through known post processing techniques.

Figure 5:
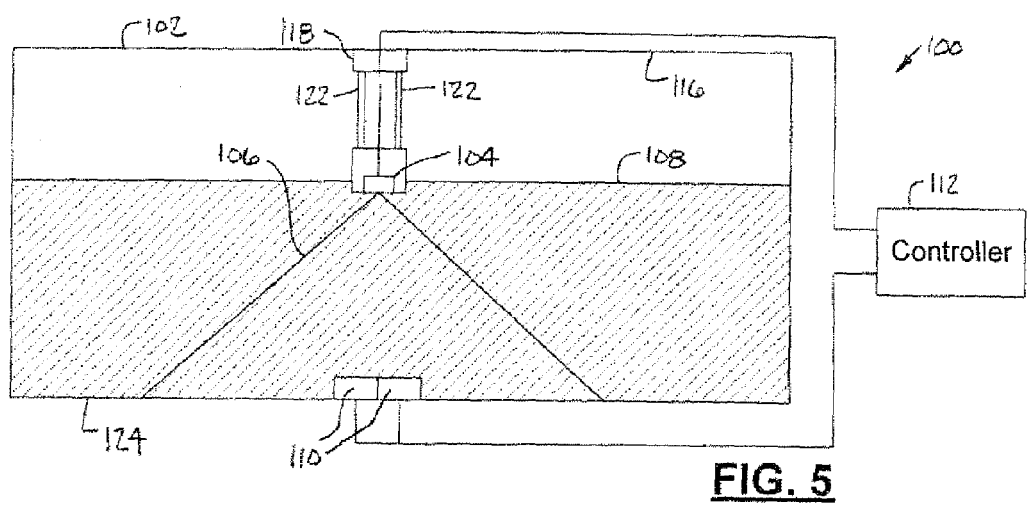
FIG. 5 is a side block diagrammatic view of a distance measuring system as applied to a fuel tank in accordance with another embodiment of the present invention.

Referring now to FIG. 5, a side block diagrammatic view of a distance measuring system 100 as applied to a fuel tank 102 in accordance with another embodiment of the present invention is shown. The distance measuring system 100 includes an illumination source 104 that emits a light beam 106 through the fluid 108 in the tank 102, which is detected by a pair of light sensors 110. The light sensors 110 are coupled to a controller 112 that determines the level of the fluid 108 in the tank 102.

The illumination source 104 is mounted on a float 114 that moves relative to the fluid level or can be rigidly mounted above fluid level. The float 114 is mounted on the upper wall 116 of the tank 102 via a base 118. The float 114 has a single degree of freedom, which allows it to freely move vertically relative to the base 118. The float 114 is attached to the base 118, and rides on guides or columns 122. The sensors 110 are mounted in the tank 102 opposite the illumination device 104 on the bottom wall 124 of the tank 102. Of course, the mounting locations of the illumination device 104 and the sensors 110 may be reversed or interchanged.

Figure 6:
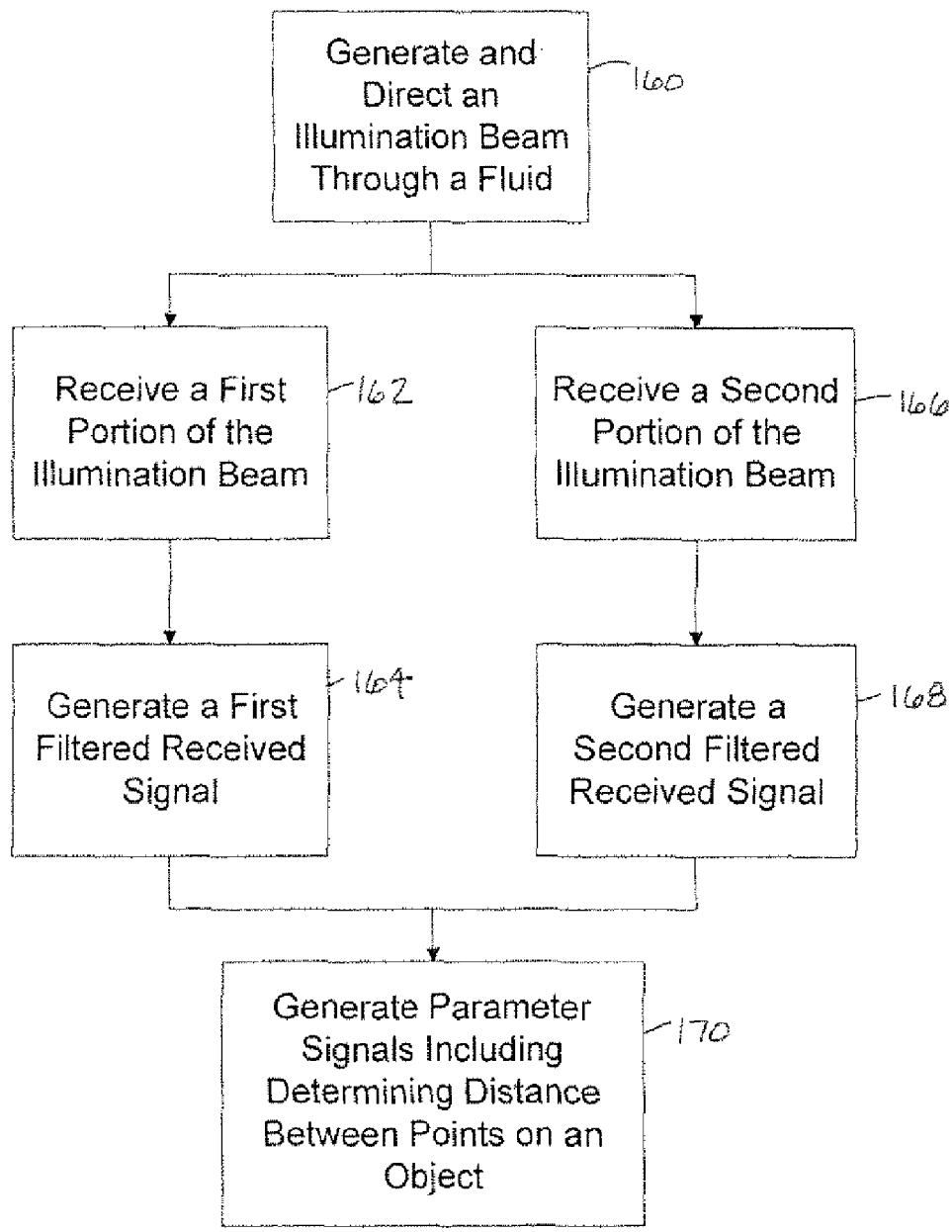
FIG. 6 is a logic flow diagram illustrating a method of determining distance between fluidic points in accordance with an embodiment of the present invention.

Referring now to FIG. 6, a logic flow diagram illustrating a method of determining distance between fluidic points in accordance with an embodiment of the present invention is shown.

In step 160, one or more illumination devices, such as the illumination devices 50, 72, and 104, generate and direct one or more illumination beams into an object, such as the shells 42 and 42', the inner fluids 44 and 44', the fluid-containing device 76, or the fluid 108.

In step 162, one or more of the light filters or light sensors, such as the light filters 85 and 86 and the light sensors 52, 52', 80, 82, and 110, receives and filters a first portion of the illumination beam. When the filters are hardware-based, such as shown in FIG. 4, the light is received by the light filters prior to the light sensors. In step 164, one or more of the light sensors receives the first filtered portion and generates a first filtered spectrum frequency signal in response thereto. The first filtered signal is associated with one or more light spectrum frequencies. Note that when software filters are used steps 162 and 164 may be performed in a reverse order.

In step 166, one or more of the light filters or light sensors receives and filters a second portion of the illumination beam. In step 168, one or more of the light sensors receives the second filtered portion of the illumination beam and generates a second filtered received signal in response thereto. The second filtered signal is associated with one or more light spectrum frequencies that are different than that associated with the first filtered signal. For example, the first filtered signal may have a first associated spectrum range and the second filtered signal may have a second associated spectrum range. As with steps 162 and 164, steps 166 and 168 may be performed in reverse when software filters are used.

In step 170, a controller or a control circuit, such as the controllers 54 or 112 and the control circuit 78, generates one or more parameter signals in response to the first filtered signal and the second filtered signal. The parameter signals may include the distances between points across one or more sections of an object, such as the distance L, above described. The parameter signals may include a length signal, a fill or fluid level signal, a compression signal, a depth signal, a distance signal, a displacement signal, a velocity signal, an acceleration signal, and other elated parameter signals. The velocity and acceleration signals may be derived from the displacement signal using known hardware and/or software techniques.

The above-described steps are meant to be illustrative examples only; the steps may be performed sequentially, synchronously, simultaneously, or in a different order depending upon the application.

The present invention provides a distance measuring system for a fluid containing device or a device that is configured for light passage and absorbance. The present invention is repeatable, reliable, accurate, and is capable of being used for high-speed applications. The present invention is also versatile such that it may be applied to an infinite number of applications where distance measuring is desired.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A sensing system comprising:
   at least one fluid bladder;
   at least one illumination device coupled to said fluid bladder and operable to generate and direct at least one illumination beam into said fluid bladder;
   a first light sensor coupled to said fluid bladder, comprising a first light filter, and operable to generate a first signal in response to at least a first received portion of said at least one illumination beam; and
   a second light sensor coupled to said fluid bladder, comprising a second light filter for filtering a frequency range different than that which is filtered by said first light filter, and operable to generate a second signal in response to at least a second received portion of said at least one illumination beam;
   wherein said first light sensor and said second light sensor positioned relative to said at least one illumination device for distance determination between said at least one illumination device and at least one of said first light sensor and said second light sensor.

2. A sensing system as set forth in claim 1, said sensing system further comprising:
   a controller in communication with said first light sensor and said second light sensor and operable to generate at least one parameter signal associated with a characteristic of the fluid;
   wherein said at least one parameter signal is generated through division of said first signal by said second signal.

3. A sensing system as set forth in claim 1, wherein said at least one fluid bladder is biofidelic and is configured for insertion within an anthropomorphic test device (ATD).

* * * * *

UNITED STATES PATENT AND TRADEMARK OFFICE
CERTIFICATE OF CORRECTION

PATENT NO. : 7,636,169 B2
APPLICATION NO. : 11/422116
DATED : December 22, 2009
INVENTOR(S) : Ali M. Elhagediab It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 476 days.

Signed and Sealed this

Ninth Day of November, 2010

David J. Kappos
*Director of the United States Patent and Trademark Office*